Patented Aug. 17, 1948

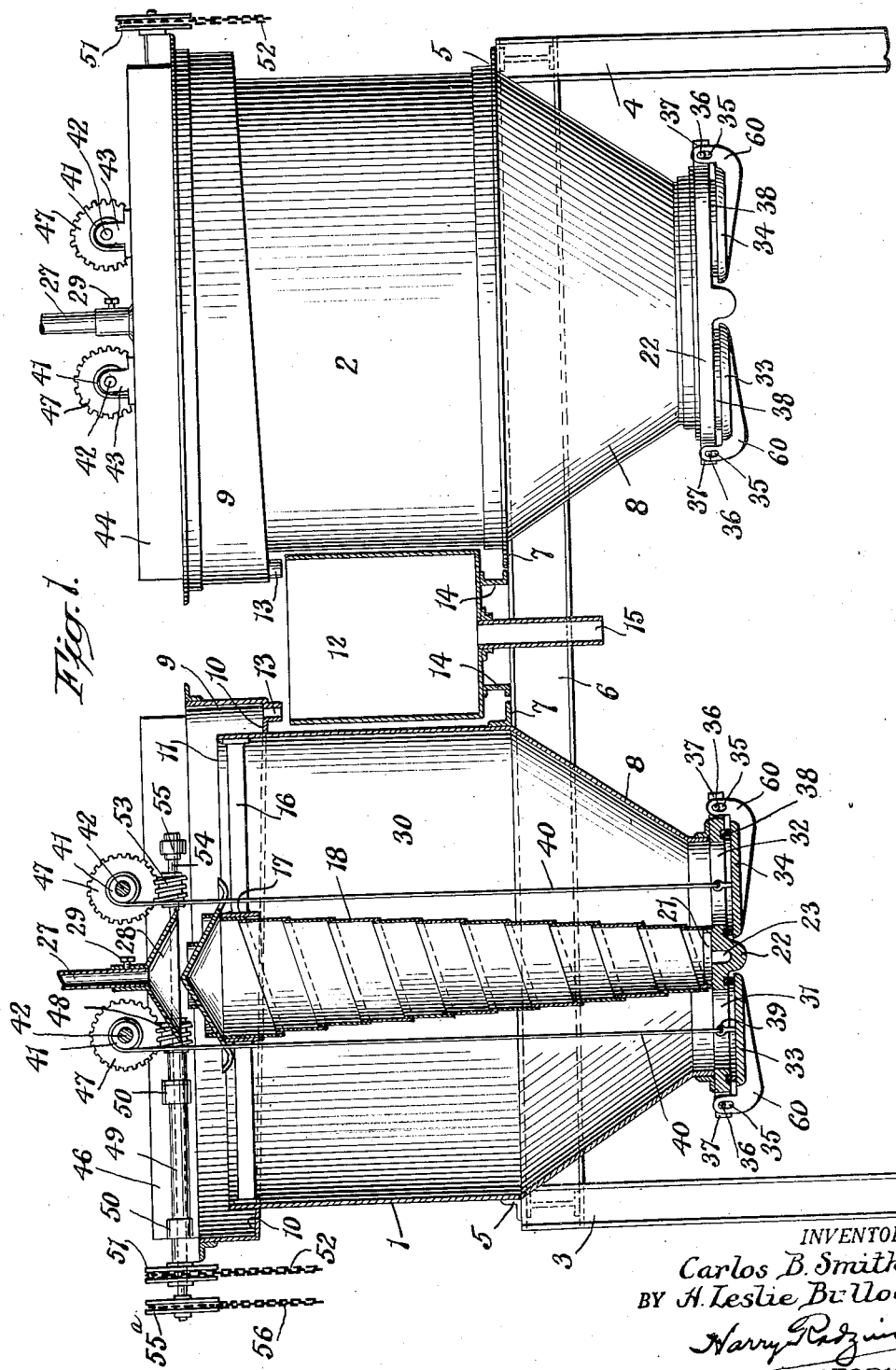

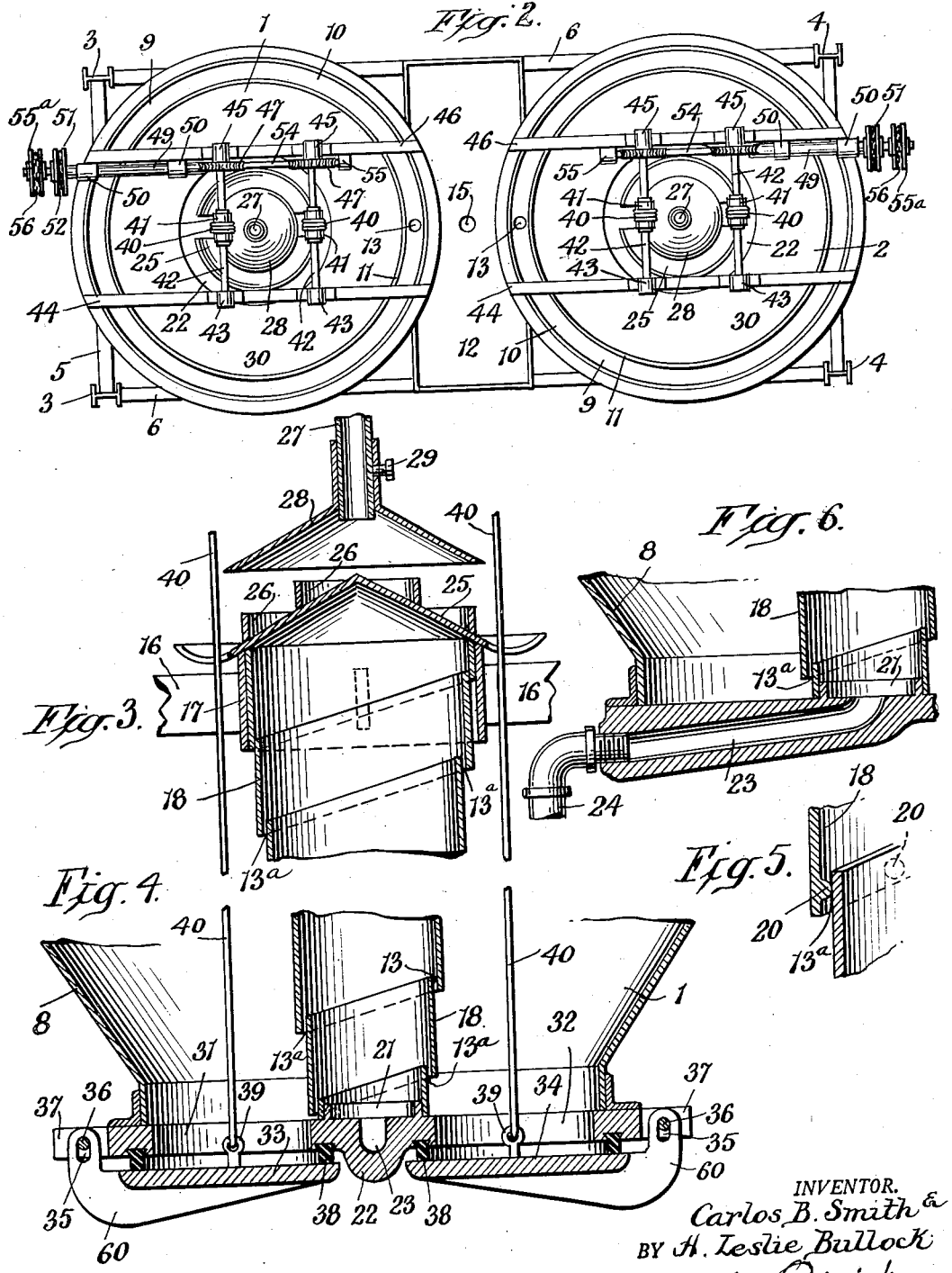

2,447,286

UNITED STATES PATENT OFFICE 2,447,286

SLUDGE SETTLING AND DEWATERING TANK

Carlos B. Smith and Harry Leslie Bullock, New York, N. Y.

Application March 23, 1946, Serial No. 656,743

3 Claims. (Cl. 210—57)

This invention relates to improvements in sludge-settling and dewatering tanks such as used for the purpose of separating solids from a circulating liquid medium by the action of gravity in turbid flow. An object of the invention is to provide an apparatus which will drain the liquid from the collected solids during a period when the flow of circulating liquid is shut off from the tank, this draining being accomplished by using the collected solids as their own filter medium.

Another object of the invention is to provide, in a structure of this character, an arrangement of two similar or substantially similar tanks, one of which can be used for the continuous removal of solid material from the circulating fluid at the time that the other tank is being used for the separation of the conveying fluid from the solid material contained within the latter tank, and for the removal of the sludge.

Still another object of the invention is to provide, in a structure of this character, a separating means arranged in the form of a conical helix disposed vertically in the form of a tubular column and substantially centrally of the tank, and by means of which solid material entering the tank will be distributed inside of the tank and around the outside of the helix, while the liquid will drain down through the helix and to the bottom thereof from whence it may flow through a suitable outlet.

These and other objects are attained by the structure hereinafter described and more particularly pointed out in the claims appended hereto.

In the accompanying drawings, wherein an illustrative embodiment of the invention is disclosed, Fig. 1 is an elevational view of a double or duplex tank arrangement constructed in accordance with the invention, one of the tanks being shown in section; Fig. 2 is a plan view of the structure of Fig. 1; Fig. 3 is a vertical sectional view of the upper portion of the helical column and the parts which surround it; Fig. 4 is a sectional view of the lower end of one of the tanks, showing the trap outlets through which the collected sludge is removed; Fig. 5 is a sectional view of a part of the helix, showing the means for holding the convolutions in spaced relation; and Fig. 6 is a sectional view through a part of the lower end of one of the tanks, showing the drain outlet.

In the embodiment of the invention shown in the drawings, two similar tank units are disclosed, the same being indicated respectively at 1 and 2. For intermittent or interrupted service, a single tank can be used, but for continuous or uninterrupted use, two tanks are preferable since one of the tanks can be used for receiving the inflow at the time that the other tank is being cleaned of its accumulated sludge.

If two tanks are used, they are preferably supported in side-by-side relationship in the manner illustrated, by a suitable supporting structure or frame including the upright beams 3 and 4, connected by various horizontally disposed supports, some of which are shown at 5, 6 and 7. This arrangement of a supporting structure is illustrative since any suitable arrangement for supporting the tanks can be employed, the essential requirement thereof being that it shall hold the lower ends of the tanks elevated above the floor to allow opening of the trap or clean-out doors with which said ends are provided, and the emergence of the sludge therefrom into suitable collection receptacles or trucks.

Both of the tanks and their operating parts are similar in construction and therefore a description of one of them will suffice for both. Each tank is, in the form shown, of substantially cylindrical shape and of hopper design, thus being provided with the conical lower end 8. Surrounding the upper end of the tank is a collecting launder 9 having an inturned flange or bottom 10 located slightly below the upper edge 11 of the body of the tank. The bottom 10 of the launder 9 is provided with a discharge pipe 13, discharging into an overflow and circulating-pump supply tank 12, said tank 12 being supported upon the beams 14 of the frame structure at a point between the two tanks, and being provided with an outlet pipe 15 that is connected to a circulating pump (not shown) which delivers the liquid into the system for re-delivery into the tank.

At the top of the tank is provided a frame or spider 16 having a central annulus 17, in which is supported the upper end of a helix 18 wound in such a manner that it decreases in diameter from top to bottom. The helix is constructed from relatively wide and flat strip metal and its convolutions are so arranged that they overlap to some extent but are maintained in slightly spaced relation, as indicated at 13a in Figs. 3, 4 and 5. The spaced-apart relationship of the convolutions of the helix is desirable to permit the passage of solids to the exterior of the helix and the drainage of liquid into the interior of the helix, as will be explained. The helix, arranged as described, and more clearly shown in Fig. 1, is thus in the form of a conical, tubular column arranged centrally of the tank, and it has its lower or smaller end secured to the flange 21 rising from the inner face of the bottom 22 of the tank. Within the flange 21, the bottom 22 of the tank is provided with a drain passage 23 (Fig. 5) leading from the bottom and connected as shown to a pipe 24 from whence the water is drained off.

Mounted over the upper end of the helix 18 and supported by the annulus 17 is a distributing cone 25 provided on its top with the velocity checks 26. Located above the cone 25 is an inlet pipe 27 provided at its end with the conical splash guard 28, held in place by the screw 29.

The water or other circulating fluid descends from the pipe 27 and flows over the distributing cone 25 to flow therefrom down into the tank and fill the same until the water level reaches the top edge 11 of the tank and it then flows thereover into the launder 9 and out through the pipe 13 and into the overflow supply tank 12. In passing from the edge of the distributor cone 25 to the launder 9, the velocity of the water flow is reduced to a very low value and thus the solid material contained in the liquid sinks to the bottom of the tank around the outside of the helical column 18. As the solid material accumulates in the tank, it builds up around the helical column 18 in the annular space 30 between the periphery of the helix and the wall of the tank. When the tank is two-thirds or three-fourths full of the solid material or sludge, the flow through inlet 27 is shut off and the drain connection 23, 24 is opened. Liquid present in the solid material will filter through such material and will pass through the spaces or apertures 13a between the convolutions of the helix 18 to thereby reach the inside of the helix and drain downwardly therein to reach the outlet 23 where it is drained off through pipe 24.

The vertically-disposed helical column 18, being centrally positioned in the tank, forms the annular sludge-collection chamber 30 between it and the wall of the tank. Provided in the bottom 22 of the tank are sludge-discharge openings 31 and 32, normally closed by the pivoted trap doors 33 and 34. Each of said doors is provided with the ears 60, slotted as at 35 to loosely fit a pivot pin 36 mounted in lugs 37 formed on the bottom 22 of the tank. This pivotal arrangement of the trap doors allows the same to be swung upwardly and against the sealing gaskets 38 positioned around each of the outlet openings 31 and 32, to thereby seal said openings. It also permits the trap doors to be swung downwardly when it is desired to clean out the tank. The means for opening and closing the trap doors will be described.

The trap door indicated at 33 is provided with a centrally-positioned eye 39 arising from its inner face, and to which one end of a cable 40 is secured, said cable extending upwardly through the tank and extending around a drum 41 secured on a cross-shaft 42. The shaft 42 is journalled at one end in a bearing 43 secured on a bar 44 extending across the top of the tank. The opposite end of the shaft 42 is journalled in bearing 45 mounted on the cross bar 46.

Secured on the shaft 42 is a worm gear 47 driven by a worm 48 on a tubular drive shaft 49, said shaft being rotatively mounted in the bearings 50 and carrying a sprocket 51, driven by a chain 52, extending from an electric motor, or a hand crank or other suitable source of power whereby the shaft 49 may be rotated to cause a raising or lowering of the trap door 33 as required.

Trap door 34 is provided with the elements 39 to 48 inclusive, the worm gear 47 for this trap door raising and lowering means being driven by a worm 53 secured on a shaft 54 journalled at one end in a bearing 55 and extending through and rotative within the tubular drive shaft 49. Shaft 54 carries a sprocket 55a driven by a chain 56 extending from a motor, hand-crank or other suitable power source.

Through the structure described, it will be seen that the trap doors may be independently raised or lowered, or if desired, a simultaneous raising and lowering of the same may be made possible.

From the foregoing, the operation of the improved tank construction will be readily understood. As previously explained, the tank is filled to the top by inflow from pipe 27, the water flow therefrom being directed by the conical distributor plate 25 into the annular sludge-collection and filtering chamber 30. Solid material in the liquid will build up in the chamber 30 around the helical column 18, and liquid will filter through the solid material to drain through the aperture 13a between the convolutions of the helix, to drain down through the inside of the helix and out through the drain outlet 23. When the flow from drain outlet 23 ceases and the material in the tank has been dewatered to a maximum extent, the discharge or trap doors 33 and 34 are opened and the dewatered sludge then accumulated in the chamber 30 is dropped into a truck or other container for removal. The trap doors 33 and 34 are then swung upwardly to closed position by winding of the cables 40 around the respective drums, and the tank is then ready for another operating period. While the cleaning-out operation above described is taking place in connection with one of the tanks, the second tank can be in operation, and in this manner continuous operation is assured. However, in cases where a short interruption in operation is not inconvenient, a single tank need only be used.

The conical, centrally-disposed, helical column serves to provide continuous drainage from the top to the bottom of the tank, since the spirally-arranged aperture between the spaced convolutions of the helix permits any solids in the liquid to drop down through this aperture to the bottom of the annular chamber 30 or to the top of the solid material already deposited therein. It is to be noted that the winding of the helix is so arranged that each convolution overlaps that situated below it, or in other words the upper convolution is on the outside of the lower one in the overlapping area, similarly to the overlap of shingles on a roof, but with spacing between the overlapped parts as herein pointed out. Moreover, the winding of the helix in the manner described, resulting in the formation of a conical tubular column, produces an outside surface on the helix which forms an acute angle in respect to the vertical wall of the tank, with the apex of the angle toward the top of the tank. Such a construction eliminates any surfaces likely to provide a wedging action which would lead to the bridging of solids between the walls of the tank and the helix.

Having described one embodiment of the invention, it is obvious that the same is not to be restricted thereto, but is broad enough to cover all structures coming within the scope of the annexed claims.

What we claim is:

1. In a structure of the character described, a tank having a vertically-disposed, centrally-arranged closed-top, tubular helix of flat strip material extending from its top to its bottom and providing an annular sludge-collection chamber between it and the inner wall surface of the tank, an inlet located above the closed top of the helix the convolutions of the helix being in partly overlapped relation and being spaced apart to provide an aperture between them, the helix being of greatest diameter at its top and decreasing progressively in diameter from its top to its lower end, the tank having a bottom provided with means for receiving and supporting the lower end of its helix, said bottom being provided with a drain opening surrounded by the helix, and trap-doors at the bottom of the sludge-collection chamber for permitting removal of sludge therefrom.

2. In a structure of the character described, a tank body having a spider at its upper end, a bottom having a centrally-disposed annular wall surrounding a drain opening, a tubular conical helix of flat strip material having its upper end supported by the spider and its lower end engaging the annular wall, the helix having the vertical wall surfaces of its convolutions overlapped and spaced apart to provide an aperture between them.

3. In a structure of the character described, a tank body of substantially cylindrical form, said tank having a normally closed bottom, a tubular column within the tank body, said column being in the form of a helix having its convolutions increasing in diameter from its lower end to its top partly overlapped and spaced to provide an aperture between them, the helix being of conical form with its end of lesser diameter located at the bottom of the tank, an annular launder located at the top of the tank, an overflow pipe leading therefrom, a distributing plate situated above and closing the upper end of the column, an inlet pipe located above and directing fluid against the distributing plate, the bottom of the tank body being provided with outlet openings, doors for normally closing said openings, means for operating said doors, and the bottom of the tank being provided with a drain opening surrounded by the lower end of the helix.

CARLOS B. SMITH.
HARRY LESLIE BULLOCK.

REFERENCES CITED

The following references are of record in the file of this patent:

UNITED STATES PATENTS

| Number | Name | Date |
| --- | --- | --- |
| 408,487 | Jewell | Aug. 6, 1889 |
| 765,182 | King | July 19, 1904 |
| 813,434 | Jones | Feb. 27, 1906 |
| 990,861 | Hamill | May 2, 1911 |
| 1,148,237 | Kneuper | July 27, 1915 |
| 1,757,187 | Griffith | May 6, 1930 |
| 1,787,634 | Laubner | Jan. 6, 1931 |
| 1,887,177 | Adams | Nov. 8, 1932 |
| 2,000,490 | Mandahl | May 7, 1935 |
| 2,064,511 | Wells | Dec. 15, 1936 |
| 2,077,074 | Schneible | Apr. 13, 1937 |
| 2,100,266 | Perry | Nov. 23, 1937 |
| 2,409,585 | Piatt | Oct. 15, 1946 |

FOREIGN PATENTS

| Number | Country | Date |
| --- | --- | --- |
| 461,162 | Germany | June 13, 1928 |
| 582,953 | Germany | Aug. 25, 1933 |